United States Patent
Itskovich et al.

(10) Patent No.: US 7,689,363 B2
(45) Date of Patent: Mar. 30, 2010

(54) DUAL STANDOFF RESISTIVITY IMAGING INSTRUMENT, METHODS AND COMPUTER PROGRAM PRODUCTS

(75) Inventors: Gregory B. Itskovich, Houston, TX (US); Stanislav Wilhelm Forgang, Houston, TX (US); Alexandre N. Bespalov, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 66 days.

(21) Appl. No.: 11/748,696

(22) Filed: May 15, 2007

(65) Prior Publication Data

US 2008/0288171 A1 Nov. 20, 2008

(51) Int. Cl.
  *G01V 3/20* (2006.01)
  *G01V 3/00* (2006.01)
(52) U.S. Cl. .............................. 702/7; 175/50; 324/367
(58) Field of Classification Search ...................... 702/7, 702/40; 324/323, 327, 348, 359, 367, 374, 324/375, 221; 175/50; 367/86
See application file for complete search history.

(56) References Cited

U.S. PATENT DOCUMENTS

| | | | |
|---|---|---|---|
| 6,600,321 B2 | 7/2003 | Evans | |
| 6,714,014 B2 | 3/2004 | Evans et al. | |
| 6,924,640 B2 * | 8/2005 | Fickert et al. | 324/221 |
| 7,066,282 B2 | 6/2006 | Chen et al. | |
| 7,073,609 B2 * | 7/2006 | Tabanou et al. | 175/50 |
| 2001/0048638 A1 | 12/2001 | Evans et al. | |
| 2002/0153897 A1 | 10/2002 | Evans et al. | |
| 2003/0155925 A1 | 8/2003 | Tabarovsky et al. | |
| 2003/0164706 A1 | 9/2003 | Iwanicki et al. | |
| 2003/0173968 A1 | 9/2003 | Cheung et al. | |
| 2004/0051531 A1 | 3/2004 | Chemali et al. | |
| 2004/0245991 A1 | 12/2004 | Hayman et al. | |
| 2005/0067190 A1 * | 3/2005 | Tabanou et al. | 175/50 |
| 2005/0134280 A1 | 6/2005 | Bittar et al. | |
| 2005/0242819 A1 | 11/2005 | Gold et al. | |
| 2007/0046290 A1 | 3/2007 | Bespalov et al. | |

OTHER PUBLICATIONS

International Search Report for International Application No. PCT/US 08/62929. Mailed Aug. 15, 2008.
Written Opinion of the International Searching Authority for International Application No. PCT/US 08/62929. Mailed Aug. 15, 2008.
Pavlovic, et al. "Oil-Base Borehole Image Applications in Thinly Bedded Sand Shale Sequences". SPE 81076. SPE Latin American and Caribbean Petroleum Engineering Conference held in Port-of-Spain, Trinidad, West Indies, Apr. 27-30, 2003.

(Continued)

*Primary Examiner*—John H Le
(74) *Attorney, Agent, or Firm*—Cantor Colburn LLP (57) ABSTRACT

A resistivity imaging apparatus includes: a first sensor electrode disposed on an electrode pad and positioned at a first standoff; a second sensor electrode disposed on the electrode pad and adjacent the first sensor electrode, the second sensor electrode positioned at a second standoff; and a return electrode disposed on the electrode pad, wherein the sensor electrodes and the return electrode are configured for injecting current into a formation and receiving a signal from the formation. Other embodiments, methods and computer program products are disclosed.

19 Claims, 7 Drawing Sheets

OTHER PUBLICATIONS

Al-Waheed, et al. "Applications of the Azimuthal Resistivity Imager Tool in Saudi Arabia". SPE 28439. SPE 69th Annual Technical Conference and Exhibition held in New Orleans, LA, USA, Sep. 25-28, 1994.

Laastad, et al. "Water-Based Formation Imaging and Resistivity Logging in Oil-Based Drilling Fluids-Today's Reality". SPE 62977. SPE Annual Technical Conference and Exhibition held in Dallas, Texas, Oct. 1-4, 2000.

* cited by examiner

DUAL STANDOFF RESISTIVITY IMAGING INSTRUMENT, METHODS AND COMPUTER PROGRAM PRODUCTS

BACKGROUND OF THE INVENTION

1. Field of the Invention

The teachings herein relate to formation imaging, and in particular, to systems and methods implementing a dual offset resistivity imaging instrument.

2. Description of the Related Art

In underground drilling applications, such as oil and gas exploration and recovery, a borehole is drilled into the earth. As a part of the drilling process, drilling mud is typically introduced into the borehole. One type of drilling mud is referred to as "oil-based" mud, while another is "water-based" mud. Other fluids may be found in a borehole as well. For example, boreholes may include formation fluids such as oil, gas, water, salinated water as well as various combinations of these and other fluids. The various fluids found in a borehole can present complications for imaging of the formation.

One technique for imaging downhole formations is that of resistivity imaging. Aside from the presence of various fluids, many factors can affect the resolution of the resistivity imaging instruments. For example, tool standoff (i.e., the gap between the surface of the sensor and the wall of the borehole), variability of the standoff, and variability of the electrical properties of the drilling mud as well as the formation can all affect resolution of the resistivity imaging instrument.

One particular challenging situation for imaging low resistivity formations, such as in the Gulf of Mexico, arises in the wells where the oil-based mud has been used as a drilling fluid. In contrast, the oil-based mud is typically characterized by a very high value of resistivity. That is, total impedance, measured by a resistivity imaging instrument, primarily includes three sequentially connected impedances formed respectively by the formation, the drilling fluid, and the instrument measurement circuit itself. Typically, impedance of the instrument measurement circuit has been known and small compared to those of the formation and drilling fluid, and, therefore, could be easy accounted for or often neglected. Accordingly, sensitivity of the instrument to the changes in resistivity of the formation deteriorates as a contribution of the formation into the overall impedance goes down.

What are needed are techniques for enhancing resistivity images taken downhole. Preferably, the techniques provide improved image quality in the conditions of oil-based mud and low resistive formations.

SUMMARY OF THE INVENTION

Disclosed is a resistivity imaging apparatus that includes a pad including at least one pair of sensor electrodes, wherein a first sensor electrode is disposed on a first plane and an adjacent second sensor electrode is disposed on a second plane.

Also disclosed is a resistivity imaging apparatus that includes a first sensor electrode disposed on an electrode pad and positioned at a first offset; a second sensor electrode disposed on the electrode pad and adjacent the first sensor electrode, the second sensor electrode positioned at a second offset; and a return electrode disposed on the electrode pad, wherein the sensor electrodes and the return electrode are configured for injecting current into a formation and receiving a signal from the formation.

Further disclosed is a resistivity imaging method, including: performing a first impedance measurement of a formation at a first standoff; performing a second impedance measurement of the formation at a second standoff; and calculating electrical properties of the formation from the first and second impedance measurements.

In addition, a computer program product including computer-executable instructions stored on machine readable media, the product for determining resistance of a formation by performing a method is provided and calls for: performing a first impedance measurement with a first sensor electrode disposed at a first offset; performing a second impedance measurement with a second sensor electrode disposed at a second offset; and calculating the resistance of the formation using the first and the second impedance measurements.

Other embodiments may be realized that include computer program products for implementation of the method, as well as instruments for implementation of the embodiments.

BRIEF DESCRIPTION OF THE DRAWINGS

Referring now to the drawings wherein like elements are numbered alike in the several Figures.

DETAILED DESCRIPTION OF THE INVENTION

Disclosed herein is a resistivity imaging instrument that uses currents flowing between the instrument and surrounding earth formations for generation of high resolution resistivity images. Aspects of the instrument as well as techniques for processing data are provided.

In typical embodiments, the instrument includes at least two sensor electrodes, each one having a fixed and unique offset from the plane forming an external surface of a sensor pad. For convenience, these electrodes are simply referred to as "dual offset sensor electrodes," "sensor electrodes," or by other similar terms. However, one skilled in the art will appreciate the many other embodiments that fulfill aspects of the teachings herein. Accordingly, use of two sensor electrodes as described herein is merely illustrative and not limiting of the invention.

Using the dual offset sensor electrodes, resistance of a formation can be calculated with only slight dependence on parasitic effects of standoff, variability of standoff, and variability of the mud electrical properties. The dual offset sensor electrodes can further be implemented to calculate resistivity of drilling mud as well as a dielectric constant of the drilling mud. These calculations may be performed independent of one another. It is appreciated that the systems and methods described herein can be implemented with operations including, but not limited to measurement-while-drilling (MWD), logging-while-drilling (LWD), logging-while-tripping (LWT), etc.

Figure 1:
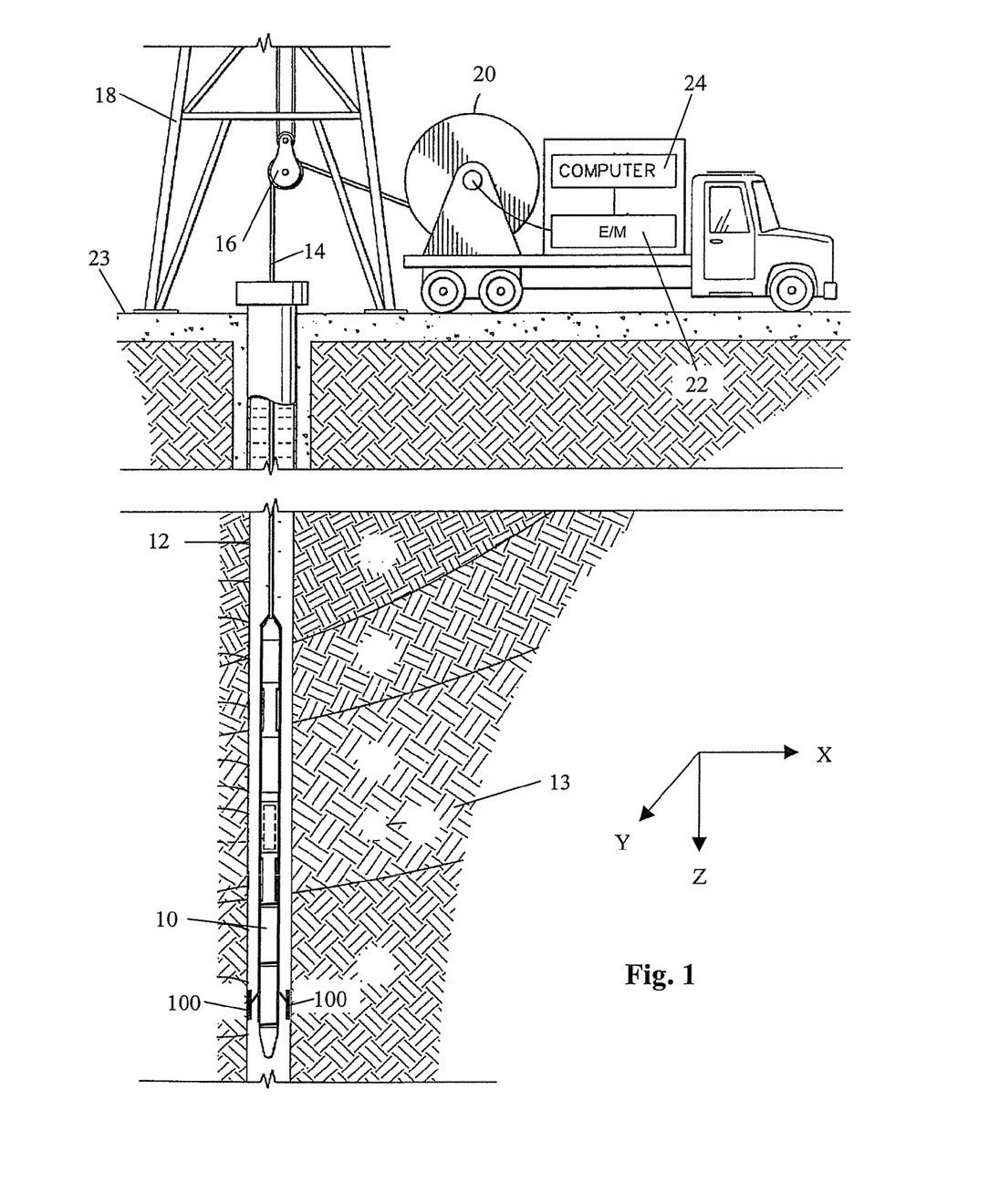
FIG. 1 illustrates an exemplary imaging instrument suspended in a borehole in accordance with exemplary embodiments.

FIG. 1 illustrates an exemplary imaging instrument 10 suspended in a borehole 12. The imaging instrument 10 (e.g., a phase-sensitive galvanic imager) penetrates earth formations such as formation 13, from a suitable cable 14 that passes over a sheave 16 mounted on drilling rig 18. Typically, the cable 14 includes a stress member and various conductors for transmitting commands to the instrument 10, for receiving data from the instrument 10 as well as providing power. The instrument 10 is raised and lowered by draw works 20. An electronic module 22, shown on the surface 23, transmits the required operating commands downhole and in return, receives data back. The data may be recorded on an archival storage medium of any desired type for concurrent or later processing. The data may be transmitted in analog or digital form. Data processors such as a suitable computer 24 may be provided for performing data analysis in the field in real time or the recorded data may be sent to a processing center or both for post processing of the data.

The instrument 10 typically includes one or more electrode pads 100 disposed upon articulating arms for injecting current into the formation 13 and to collect currents for determining electrical properties of the formation 13 as described herein. Reference may be had to FIG. 2 for exemplary embodiments of the electrode pad 100.

Figure 2A:
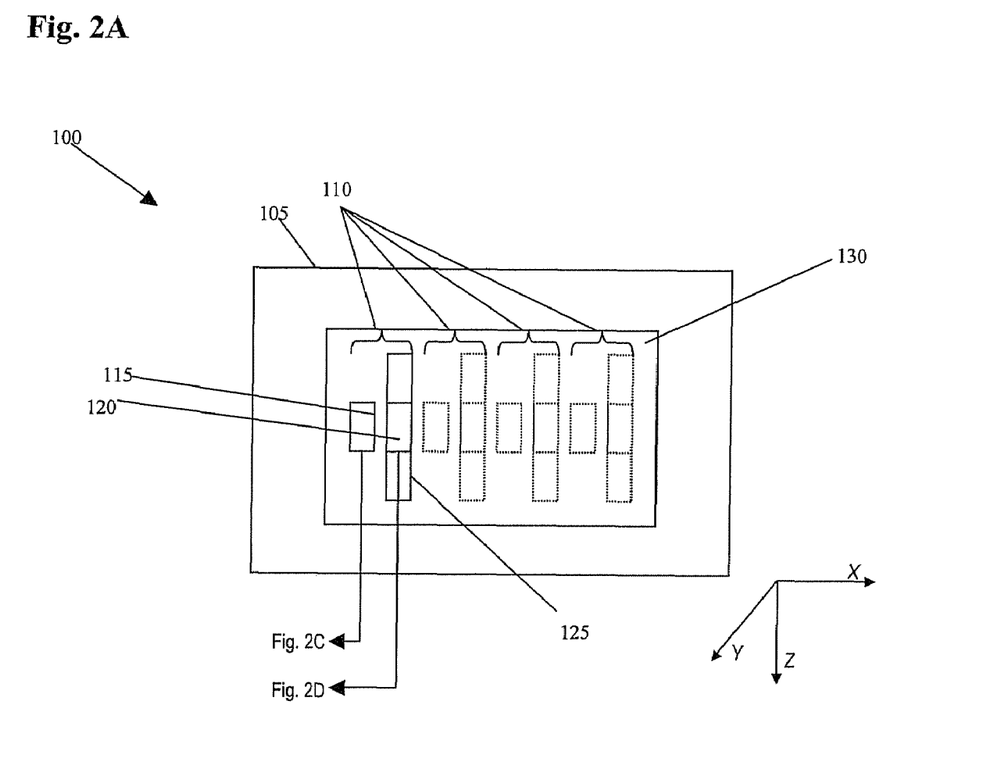
FIGS. 2A through 2D, collectively referred to herein as FIG. 2, illustrate an exemplary embodiment of a pad including dual standoff sensor electrodes.
Figure 2B:
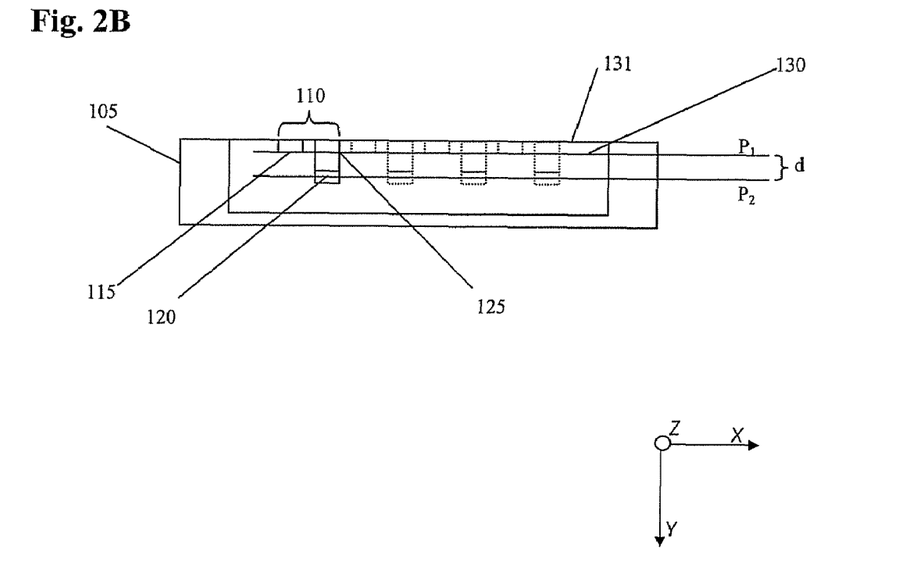

FIG. 2A illustrates a front side view of the electrode pad 100. The pad 100 includes dual offset sensor electrode pairs 110. FIG. 2B illustrates a partial top view of the pad 100 shown in FIG. 2A. It should be appreciated that the pad 100 can have any number of sensor electrode pairs 110. For illustrative purposes, only one pair of the sensor electrode pairs 110 is discussed. It should be further appreciated that the pad 100 and similar pads can be distributed on an imaging instrument 10 in a variety of ways for gathering resistivity data of a formation 13 from the borehole 12.

In an exemplary embodiment, the pad 100 includes a return electrode 105 having an insulator 130 disposed therein. Typically, the sensor electrode pairs 110 are distributed along the insulator 130 in accordance with exemplary embodiments described herein. Each of the sensor electrode pairs 110 includes a first sensor electrode 115 and a second sensor electrode 120. In some embodiments, the first sensor electrode 115 is flush with a surface 131 of the insulator 130, while the second sensor electrode 120 is recessed within a channel 125, which is recessed within the insulator 130. Each channel 125 is configured to allow mud disposed in the borehole 12 to flow without sticking to the second sensor electrode 120 and without interfering with operation of the second sensor electrode 120. As discussed further in the description below, the channels 125 are typically oriented vertically on the pad 100 for alignment with the borehole 12.

By convention, "vertical" generally refers to a z-direction (along the axis of the borehole 12) and "horizontal" refers to a plane perpendicular to the vertical. The horizontal includes an x-direction and a y-direction. For convenience and perspective, this convention is generally carried throughout the figures provided herein.

Figure 2C:
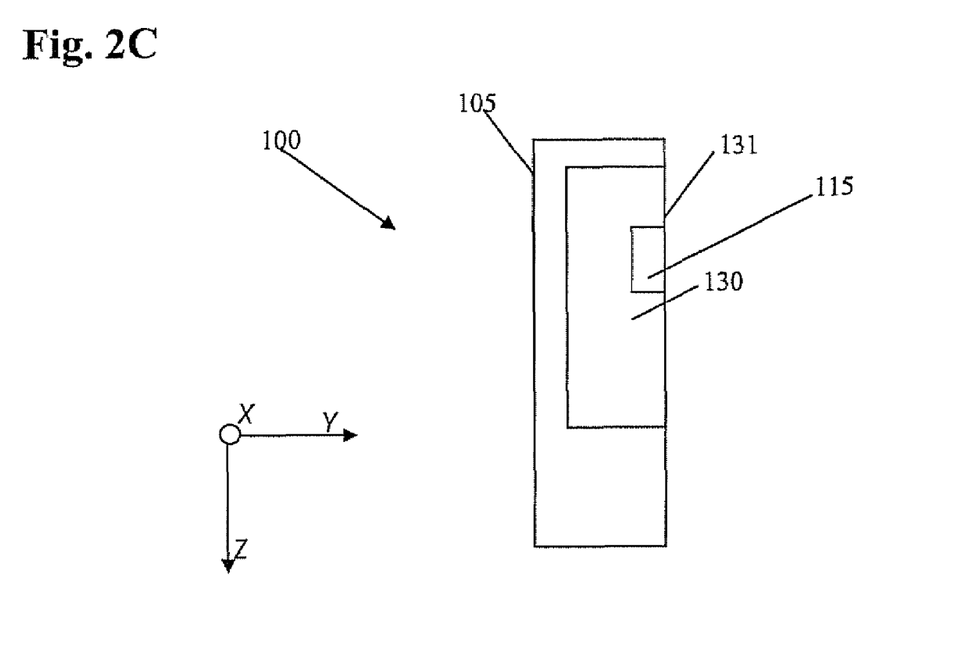
Figure 2D:
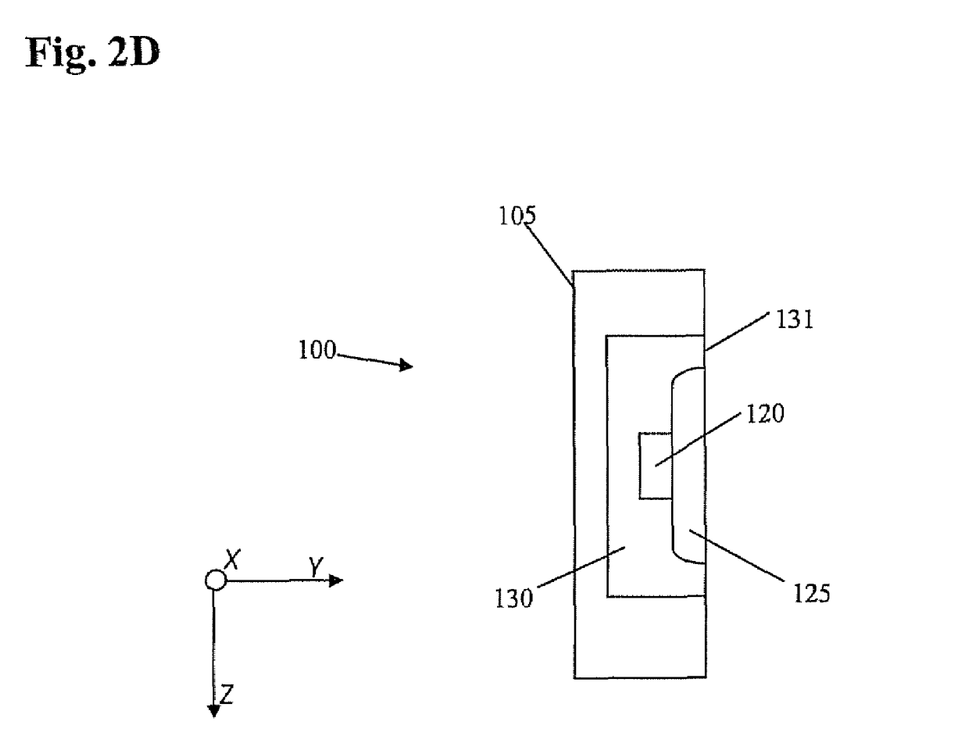

In an exemplary embodiment, the first sensor electrode 115 and the second sensor electrode 120 are offset from one another at a fixed distance. Reference may be made to FIG. 2B where the first sensor electrode 115 is oriented on a plane $P_1$ and the second sensor electrode 120 is oriented on a plane $P_2$. Planes $P_1$ and $P_2$ are separated from each other by a fixed distance, d. In one exemplary implementation, the distance d between the first sensor electrode 115 and the second sensor electrode 120 can be adjusted such that the distance, d, between the first sensor electrode 115 and second sensor electrode 120 can be varied manually prior to logging or automatically by using mechanical software-controlled techniques with appropriate apparatus in the pad 100. It should be appreciated that a distance differential between the first sensor electrode 115 and second sensor electrode 120, whether fixed or adjustable, is provided on the pad 100 such that exemplary dual standoff methods described herein may be implemented. FIG. 2C illustrates a partial side sectional view of the pad 100 shown in FIGS. 2A and 2B. FIG. 2C illustrates relative positioning of the first sensor electrode 115, the insulator 130 and the return electrode 105. Similarly, FIG. 2D illustrates a partial side sectional view of the pad 100 of FIGS. 2A-2C, and further shows the channel 125.

In an exemplary embodiment, the electrode pads 100 are rectangular in shape and oriented with the long dimension of the rectangle parallel to the tool axis of the instrument 10, which is oriented along the vertical. Each of the first sensor electrode 115 and second sensor electrode 120 of the sensor electrode pairs 110 typically have similar physical characteristics, including but not limited to shape and area, A. It is appreciated that other embodiments of the electrode pad 100 and configurations for sensor electrodes are contemplated. For the purpose of simplifying the illustration, insulation around the electrode pads 100 and respective sensor electrodes 115, 120 and focusing electrodes for electrically isolating them from the body of the imaging instrument 10 are not shown.

As used herein, the terms "offset" and other similar terms make reference to a recess or protrusion of some dimension where a sensor electrode lies below (or above) a generally planar surface of the electrode pad 100. As is known in the art, "standoff" makes reference to a region between the sensor electrode and a wall of the borehole. Typically, the standoff region is filled with drilling mud. For embodiments disclosed herein, it is further recognized that such terminology may be used to describe an electrode pad where a position of one sensor electrode has an offset that differs from the offset of another (second) sensor electrode. Stated another way, as discussed herein, a sensor electrode may include an offset without being disposed in a borehole having a drilling fluid. When disposed in a borehole, the sensor electrodes having different offset dimensions will likewise have differing standoff values.

Figure 3:
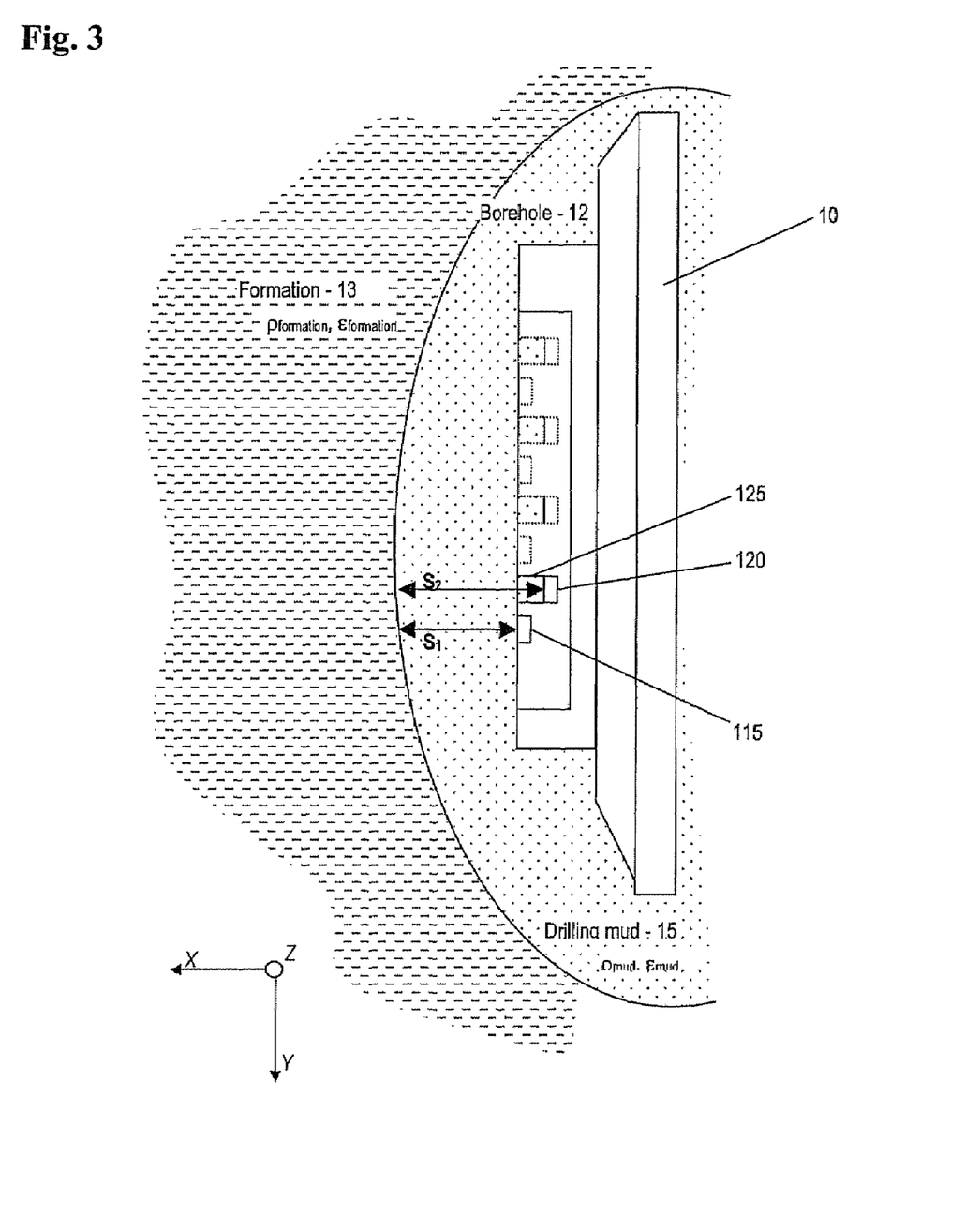
FIG. 3 illustrates a partial top down view of the exemplary embodiment of FIG. 2 disposed in a borehole.

FIG. 3 illustrates a partial top side view of the exemplary pad 100 having dual standoff sensor electrode pairs 110. In this illustration, the imaging instrument 10 (partially shown) is suspended in the borehole 12 (partially shown). Furthermore, oil-based mud 15 is shown as disposed in the borehole 12 and further disposed within the channels 125.

In an exemplary embodiment, when the instrument 10 is positioned in the desired location of the borehole 12 to obtain impedance measurements of the formation 13, two impedance measurements can be taken using the first sensor electrode 115 and the second sensor electrode 120. It is further appreciated that once the instrument 10 is in place at the vertical in the borehole 12, the first sensor electrode 115 and the second sensor electrode 120 are positioned at two different standoffs $S_1$, $S_2$ with respect to the horizontal. As illustrated, the first sensor electrode 115 is positioned at standoff $S_1$ and the second, recessed, sensor electrode 120 is positioned at standoff $S_2$. In such an orientation, the resistivity of the formation $\rho_{formation}$ (as well as the dielectric properties $\in_{formation}$) can be calculated as now described. It is further appreciated that with the exemplary methods described herein the electrical properties of the oil-based mud 15 (e.g., $\rho_{mud}$, $\epsilon_{mud}$) disposed within the borehole 250 can also be calculated.

In accordance with exemplary embodiments, the pad 100 can be used to take complex impedance measurements within the borehole 12 via capacitive coupling between the first sensor electrode 115, the second sensor electrode 120 and the formation 13. Magnitudes and mutual phases of voltage drops and current flows are measured between the return electrode 105 and each sensor electrode 115, 120 during respective measurements. As such, each sensor electrode 115, 120 may be used to inject current into the formation 13 and return measurements may be obtained in the return electrode 15. Commands for injection of current and respective measurements can be executed from the electronic module 22. Subsequent calculations of the electrical properties can be executed on the computer 24.

Figure 4:
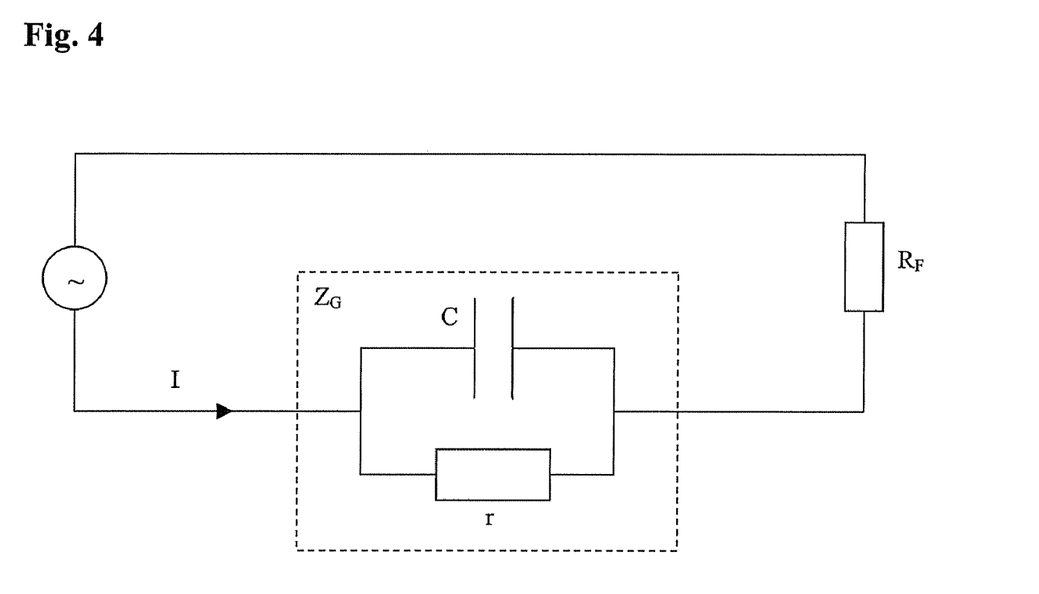
FIG. 4 illustrates an exemplary equivalent schematic circuit diagram of a respective sensor electrode.

FIG. 4 illustrates an exemplary equivalent schematic circuit diagram for one of the sensor electrodes 115, 120, and provides a review of problems associated with performing certain resistivity measurements. As represented in FIG. 4, the measured effective impedance $\dot{Z}$ includes impedance of the gap ($\dot{Z}_G$) between the respective sensor electrode and the formation 13 wherein r and C are the equivalent resistance and capacitance component of the mud filling the gap and a resistance of the formation, $R_F$. Thus, if a voltage U is applied between the given sensor electrode 115, 120 and the return electrode 105, and İ represents the current measured, the impedance $\dot{Z}$ may be written as $\dot{Z}=\dot{Z}_G+R_F=U/\dot{I}$. In the case of a low resistive formation 13 (i.e., $\rho<10$ ohm·m) and highly resistive (i.e., $\rho>1000$ ohm·m) oil-based drilling mud 15, the contribution of the formation 13 into the effective impedance $\dot{Z}$ is small ($|R_F|<<<|\dot{Z}_G|$). This leads to reduction in sensitivity of the measured impedance $\dot{Z}$ to the formation 13 resistivity, $\rho_{formation}$. The relatively large gap impedance $\dot{Z}_G$ that depends on the mud properties is thus a major contributor into the measured total impedance. Accordingly, the teachings herein provide techniques for reduction such contributions to the measured total impedance, $\dot{Z}$.

According to an exemplary embodiment, in the dual standoff resistivity measurement, influence of the oil-based drilling mud 15 on formation resistivity image is effectively eliminated by taking two impedance measurements at two different standoff distances $S_1$, $S_2$. In an exemplary embodiment, two separate complex impedance measurements are taken using the first sensor electrode 115 and the second sensor electrode 120, which are disposed at respective standoffs $S_1$, $S_2$. As discussed above, the first sensor electrode 115 and the second sensor electrode 120 have common physical characteristics such as shape and area, A. The common characteristics provide for substantial elimination of variability arising from measurement circuit components. Refer again now to FIG. 3.

In FIG. 3, the first sensor electrode 115 is disposed at a first standoff distance, (or "standoff") of $S_1$. The second sensor electrode 120 is disposed at a standoff distance of $S_2$. The standoff distance S represents a distance between a respective sensor electrode and a wall of the borehole 12. Not that position of the return electrode 105 remains unchanged.

In such an arrangement as shown in FIG. 3, the following relations hold: $S_1/S_2=r_1/r_2=C_2/C_1$ and $r_1C_1=r_2C_2$. As discussed above, $r_1$, $r_2$, $C_2$, $C_1$ are equivalent resistances and capacitances of the electrical schematics approximating oil-based mud response to the galvanic imaging instrument 10 at two standoffs $S_1$, $S_2$.

The impedances measured by each of the sensor electrodes 115, 120 can be represented as:

$$\dot{Z}_1 = R_F + \dot{Z}_{G1} \text{ where}$$

$$\dot{Z}_{G1} = \frac{r_1}{1+(r_1C_1\omega)^2} - i\frac{r_1^2\omega C_1}{1+(r_1C_1\omega)^2}, \text{ and}$$

$$\dot{Z}_2 = R_F + \dot{Z}_{G2} \text{ where}$$

$$\dot{Z}_{G2} = \frac{r_2}{1+(r_2C_2\omega)^2} - i\frac{r_2^2\omega C_2}{1+(r_2C_2\omega)^2}$$

Where $\omega$ is the operational angular frequency of the instrument 10 signal. Given the relationship $r_1C_1=r_2C_2$, $\dot{Z}_{G2}$ can be rewritten as:

$$\dot{Z}_{G2} = \frac{r_1}{1+(r_1C_1\omega)^2}\frac{C_1}{C_2} - i\frac{r_1^2\omega C_1}{1+(r_1C_1\omega)^2}\frac{C_1}{C_2}$$

Furthermore, for each standoff $S_1$, $S_2$, real and imaginary components of the complex impedances $\dot{Z}_1$ and $\dot{Z}_2$ measured by the sensor electrodes 115, 120 respectively, can be given by:

$$\dot{Z}_1 = \dot{Z}_{G1} + R_F = A_1 - iB_1 \text{ and}$$

$$\dot{Z}_2 = \dot{Z}_{G2} + R_F = A_2 - iB_2.$$

As such, the real and imaginary components can be written as:

$$A_1 = \frac{r_1}{1+(r_1C_1\omega)^2} + R_F,$$

$$A_2 = \frac{r_1}{1+(r_1C_1\omega)^2}\frac{C_1}{C_2} + R_F \text{ and}$$

$$B_1 = \frac{r_1^2\omega C_1}{1+(r_1C_1\omega)^2},$$

$$B_2 = \frac{r_1^2\omega C_1}{1+(r_1C_1\omega)^2}\frac{C_1}{C_2}$$

From the above equation pairs of the real and imaginary components, the following relations are obtained:

$$A_2 - A_1 = \frac{r_1}{1+(r_1C_1\omega)^2}\left(\frac{C_1}{C_2}-1\right) \text{ and}$$

$$\frac{B_2 - B_1}{\omega} = \frac{r_1r_1C_1}{1+(r_1C_1\omega)^2}\left(\frac{C_1}{C_2}-1\right).$$

From the above relationships, the parameters $\tau=r_1C_1$ is obtained as:

$$\tau = r_1C_1 = \frac{1}{\omega}\frac{B_2-B_1}{A_2-A_1}$$

Using the known relationship of the real and imaginary components $B_2-B_1$ and $A_2-A_1$, the value of $r_1$ is calculated as:

$$r_1 = \frac{B_1(1+(\tau\omega)^2)}{\tau\omega}$$

Therefore, the resistance of the formation, $R_F$, can be calculated as follows:

$$R_F = A_1 - \frac{r_1}{1+(\tau\omega)^2}.$$

It is therefore, appreciated that by obtaining two different impedance measurements $\dot{Z}_1$ and $\dot{Z}_2$ at the corresponding standoff $S_1$, and $S_2$, contribution of the gap impedance is eliminated, and values $A_1$, $r_1$, $\tau$, $\omega$ are used to calculate the impedance of the formation 13. Therefore, by representing the gap impedances only by known properties of the sensor electrodes 115, 120, a calculation for the resistance of the formation, $R_F$, can be obtained with all measured values. Thus, the parasitic impact of the electrical properties for the drilling mud 15 is eliminated. Similarly, the values of $C_1$, $r_2$, and $C_2$ can be calculated. Furthermore, with the known area, A, of the sensor electrodes 115, 120, properties of the drilling mud 15 can also be calculated. For the two standoffs $S_1$, $S_2$, the parameter $\Delta$ is defined as $\Delta=S_2-S_2$, such that, $r_2-r_1=\rho_{mud}\Delta/A$, where $\rho_{mud}$ can be determined as $\rho_{mud}=(r_2-r_1)A/\Delta$. Similarly the dielectric constant of the mud 15 can be determined as $\in_{mud}=(C_2-C_1)A/\Delta$.

Note that as disclosed herein, formation dielectric properties are generally neglected for the sake of clarity and simplicity. To take into consideration dielectric properties of the formation one would need to perform extra measurements using a different frequency. Then, using dual frequency and dual standoff data, both resistivity and dielectric constant of the formation can be derived.

In other exemplary embodiments, a dual standoff arrangement can be achieved with other structural arrangements. For example, the first sensor electrode 115 can be flush with the insulator 130 as discussed above. The second sensor electrode 120 can be disposed on the surface 131 of the insulator 130, which still results in an arrangement having a distance differential between the first sensor electrode 115 and the second sensor electrode 120. In still another exemplary embodiment, a single retractable sensor electrode (not shown) can be disposed on the pad 100 within the insulator 130. As such, a first set of measurements can be taken with the retractable sensor electrode positioned at a first standoff from the borehole wall. A second set of measurements can then be taken with the retractable sensor electrodes positioned at a second standoff from the borehole wall. The two sets of measurements can then be used to calculate the resistivities as described herein.

In other exemplary embodiments, formation dielectric properties can also be calculated with the methods and systems described herein. To take into consideration dielectric properties of the formation, extra measurements can be taken under the same conditions as described herein. However, a different frequency $\omega$ from the operational frequency as discussed above can be implemented. As such, using a set of dual frequencies and dual standoff data, both resistivity and dielectric constant of the formation can be derived.

Regardless of the desired electrical properties to be measured, and further regardless of the structural arrangement of the dual standoff sensor electrodes 115, 120, it is appreciated that implementing the dual standoff (i.e., offset) arrangement allows the formation electrical properties to be measured by removing parasitic impact of oil-based drilling mud 15.

Figure 5:
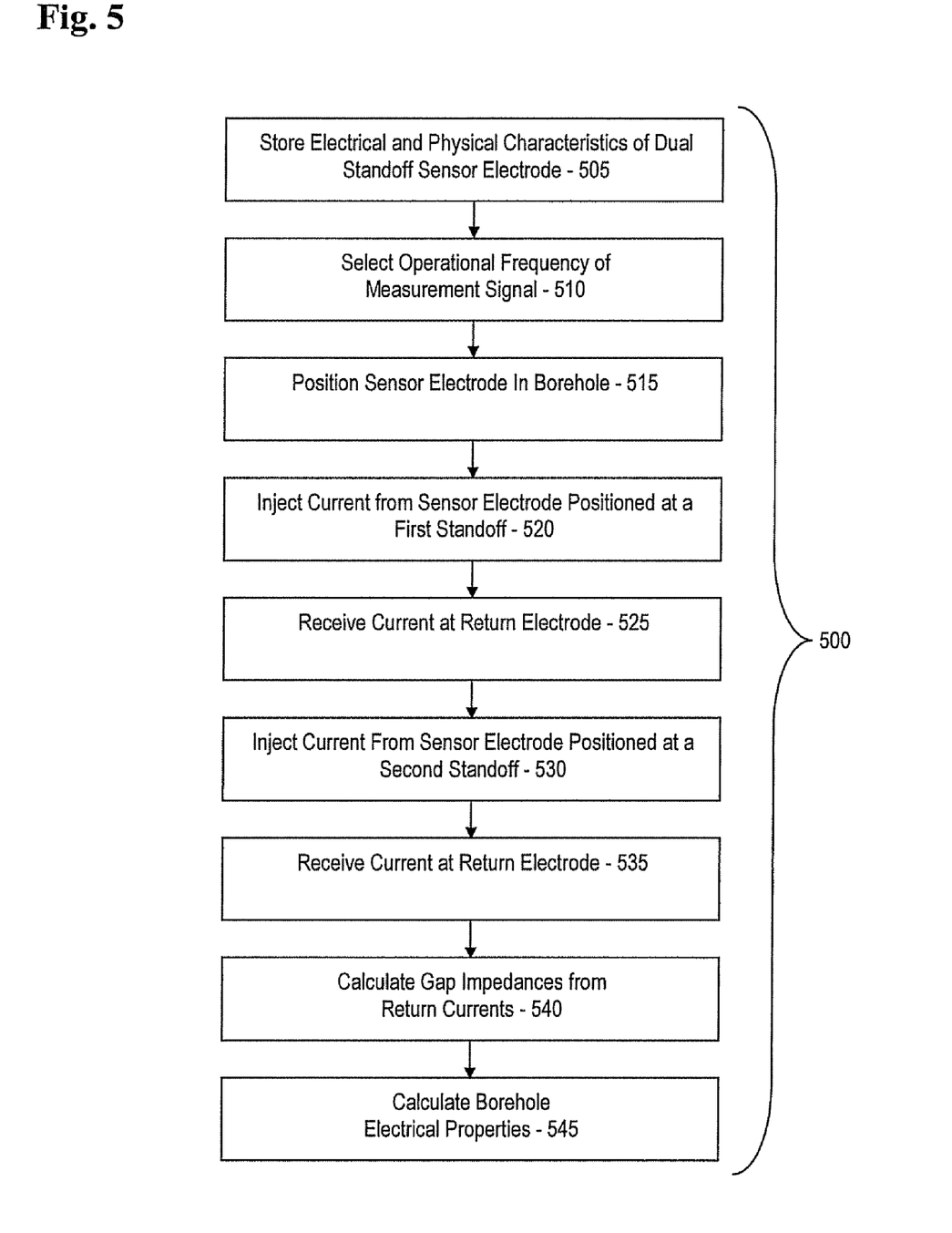
FIG. 5 illustrates an exemplary impedance measurement and calculation method implementing dual stand off arrangements.

FIG. 5 illustrates an exemplary impedance measurement and calculation method 500 implementing dual standoff arrangements. At step 505, the known electrical and physical characteristics of the sensor electrodes used in the measurements are stored in the computer 24. In the exemplary embodiments described herein, the known physical characteristics (e.g., the area, A) of the sensor electrodes 115, 120 can be stored in the computer 24. At step 510, the operational frequency $\omega$ of the instrument 10 is selected. At step 515, the instrument 10 is positioned in the borehole 12 at the position in which desired electrical properties of the formation 13 are to be measured. It is appreciated that steps 505-515 can be performed simultaneously, at distinct intervals or in an alternative order.

At step 520, current from the sensor electrode is injected into the formation 13 at a first standoff $S_1$. At step 525, the return current is measured. Similarly, at step 530 current from the sensor electrode is injected into the formation 13 at a second standoff $S_2$ and the return current is measured at step 535. As discussed above, the two different current injections and return current measurements are implemented via the sensor electrodes 115, 120 disposed at the two fixed dual standoffs $S_1$, $S_2$. In other exemplary embodiments, a single sensor electrode can be adjustable such that the single sensor electrode can be positioned at the two different standoffs $S_1$, $S_2$ to make the measurements as described.

At step 540, the gap impedances $\dot{Z}_G$ can be calculated as described above. From the gap impedance measurements, and the known electrical and physical characteristics of the sensor electrodes used in the measurements, the electrical characteristics of the borehole 12 can be calculated at step 545. As described above, the electrical characteristics of both the formation 13 and the drilling mud 15 can be calculated from the known electrical and physical characteristics of the sensor electrode and the operational frequencies of the instrument 10.

Figure 6:
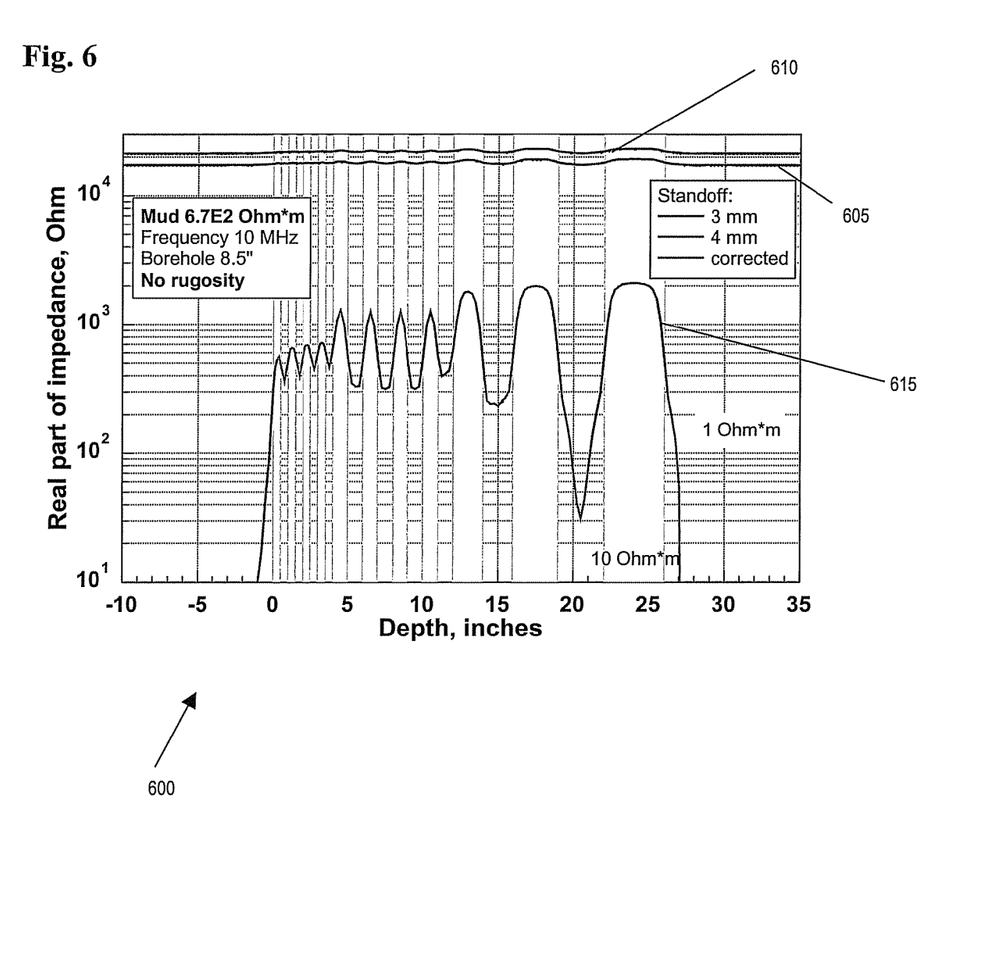
FIG. 6 illustrates mathematical modeling results for a dual standoff measurement methodology in accordance with exemplary embodiments.

As an example, a mathematical modeling approximating electrical conditions in the Gulf of Mexico is illustrated. The electrode pad 100 is set at an operational frequency set to f=10 MHz (respective operational angular frequency $\omega=2\cdot\pi\cdot f=6.283\cdot 10^7$ radian/s). The instrument 10 having the electrode pad 100 disposed thereon is placed in the well with diameter of 8.5 inch. The well is filled with the mud having resistivity $\rho_{mud}=667$ ohm·m and dielectric constant $\in_m=3$. FIG. 6 illustrates mathematical modeling results for a dual standoff measurement methodology in accordance with exemplary embodiments.

In FIG. 6, the mathematical modeling results for the case of a formation that is characterized by a sequence of resistive (10 ohm·m) and conductive (1 ohm·m) layers. The thickness of layers is varying from the left to the right from 0.5 to 4 inches. The three curves 605, 610, 615 correspond respectively the real part of the impedance for the sensor electrode (e.g., the first sensor electrode 115) with 3 mm standoff, the real part of the impedance for the sensor electrode (e.g., the second sensor electrode 120) with 4 mm standoff (the impedances being from the known electrical characteristics of the sensor electrodes 115, 120), and the corrected signal which is free of the parasitic influence of the drilling mud 15. As described above, the corrected signal is obtained by the known properties of the sensor electrodes 115, 120 and the operational frequencies, thereby removing the parasitic effects of the drilling mud 15 as shown by the gap impedance calculations above.

Therefore, the severe effects of the mud 15 are removed. The single impedance measurements as shown in curves 605, 610 illustrate how the actual signal as illustrated by curve 615 is affected. As such, by introducing a set of measurements taken with different standoffs and then combining the results in a way allowing the derived formation impedance to become substantially unaffected by electrical properties of the mud and tool standoff, the parasitic effects of the mud 15 are removed. Therefore, the dual-standoff systems and methods described herein improve the resolution of the instrument 10.

In other embodiments, additional design features may be incorporated. For example, a retrievable sensor electrode may be used (i.e., the sensor electrode can be moved in or out of the pad surface to enable each position measurement within half a time dedicated for taking sample at certain depth). This design typically integrates a push-pull mechanism to move the sensor electrode. In another embodiment, the pad includes a pair of sensor electrodes located in immediate proximity to each other with one of the sensor electrodes sticking out of the pad or, in reverse, having offset in the pad to required depth (i.e., the second standoff).

In one implementation, the instrument 10 includes a dual-standoff arrangement where each element in of the pair of sensor electrodes includes two elements in place of a single sensor electrode. In this embodiment, each individual sensor electrode is typically split on two equivalent dimensions along a vertical axis of the pad. Further, one of the sensor electrodes in the pair is typically offset inside the channel running in parallel to the pad vertical axis and having smooth edges. Including the channel allows drilling mud to flow without sticking to the surface of the sensor electrode and thus provides for proper operation.

In support of the teachings herein, various analysis components may be used, including digital and/or an analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A resistivity imaging method, comprising:
    performing a first impedance measurement of a formation at a first standoff using at least one sensor electrode disposed in a first plane;
    performing a second impedance measurement of the formation at a second standoff different from the first standoff using the at least one sensor electrode disposed in a second plane offset from the first plane; and
    calculating electrical properties of the formation from the first and second impedance measurements.

2. The method as in claim 1 wherein the first impedance measurement is performed by a first sensor electrode.

3. The method as in claim 2 wherein the second impedance measurement is performed by a second sensor electrode.

4. The method as in claim 1 wherein a resistance of the formation is calculated from known electrical values obtained with the at least one sensor electrode used to perform at least one of the first and second impedance measurements.

5. The method as in claim 4 wherein the resistance of the formation is calculated according to a relationship comprising:

$$R_F = A_1 - \frac{r_1}{1+(\tau\omega)^2};$$

where
    $R_F$ represents the resistance of the formation;
    $A_1$ represents a real part of the first impedance measurement;
    $\tau$ represents a product of a mud capacitance and resistance measured by the first and second sensor electrodes;
    $\omega$ represents an angular operational frequency of the first sensor electrode;
    $r_1$ represents a mud resistance at a first standoff, estimated according to the formula, $$r_1 = \frac{B_1(1+(\tau\omega)^2)}{\tau\omega};$$

and
    $B_1$ represents an imaginary part of the first impedance measurement.

6. The method of claim 1, further comprising varying the offset.

7. A resistivity imaging apparatus, comprising:
at least one sensor electrode configured to perform a first impedance measurement of a formation at a first standoff and to perform a second impedance measurement of the formation at a second standoff different from the first standoff, wherein the first standoff results from the at least one sensor electrode being disposed in a first plane and the second standoff results from the at least one sensor electrode being disposed in a second plane offset from the first plane and the at least one sensor electrode comprises an output for providing measurement information for calculating electrical properties of the formation from the first and second impedance measurements.

8. The apparatus as in claim 7, wherein the first impedance measurement is performed by a first sensor electrode.

9. The apparatus as in claim 8, wherein the second impedance measurement is performed by a second sensor electrode.

10. The apparatus as in claim 7, wherein a resistance of the formation is calculated from known electrical values obtained with the at least one sensor electrode used to perform at least one of the first and second impedance measurements.

11. The apparatus as in claim 10, wherein the resistance of the formation is calculated according to a relationship comprising:

$$R_F = A_1 - \frac{r_1}{1+(\tau\omega)^2};$$

where
$R_F$ represents the resistance of the formation;
$A_1$ represents a real part of the first impedance measurement;
$\tau$ represents a product of a mud capacitance and resistance measured by the first and second sensor electrodes;
$\omega$ represents an angular operational frequency of the first sensor electrode;
$r_1$ represents a mud resistance at a first standoff, estimated according to the formula, $$r_1 = \frac{B_1(1+(\tau\omega)^2)}{\tau\omega};$$

and
$B_1$ represents an imaginary part of the first impedance measurement.

12. The apparatus as in claim 7 wherein the at least one sensor electrode comprises at least one electrode configured to move from the first standoff position to the second standoff position.

13. The apparatus as in claim 7, further comprising a processor and a computer readable medium comprising computer executable instructions for calculating at least one of a resistivity of oil-based mud, $\rho_{mud}$, and a dielectric constant of the oil-based mud, $\in_{mud}$.

14. The apparatus as in claim 13, wherein the resistivity of oil-based mud, $\rho_{mud}$, is calculated by a relationship comprising:

$$\rho_{mud} = (r_2 - r_1)A/\Delta;$$

where
$r_2$ represents a mud resistance in front of the second sensor electrode positioned at a second standoff and estimated according to the formula:

$$r_2 = \frac{B_2(1+(\tau\omega)^2)}{\tau\omega};$$

$r_1$ represents a mud resistance in front of the first sensor electrode positioned at a first standoff and estimated according to the formula:

$$r_1 = \frac{B_1(1+(\tau\omega)^2)}{\tau\omega};$$

A represents an area of each of the sensor electrodes; and
$\Delta$ represents a difference between the second standoff and the first standoff.

15. The apparatus as in claim 13, wherein the dielectric constant, $\in_{mud}$, is calculated by a relationship comprising:

$$\in_{mud} = (C_2 - C_1)A/\Delta;$$

where
$C_2$ represents a mud capacitance in front of the second sensor electrode positioned at the second standoff;
$C_1$ represents a mud capacitance in front of the first sensor electrode positioned at the first standoff;
A represents an area of each of the sensor electrodes; and
$\Delta$ represents a difference between the second standoff and the first standoff.

16. The apparatus as in claim 7, further comprising a channel for at least one of the sensor electrodes, the channel providing the offset between the first plane and the second plane.

17. The apparatus as in claim 7, wherein a standoff distance, d, for the at least one sensor electrode is adjustable between a position for the first impedance measurement and another position for the second impedance measurement.

18. The apparatus as in claim 17, wherein the standoff distance, d, is adjustable by techniques comprising at least one of manual, mechanical and software-controlled.

19. A resistivity imaging apparatus, comprising:
at least one sensor electrode configured to perform a first impedance measurement of a formation at a first standoff and to perform a second impedance measurement of the formation at a second standoff different from the first standoff, and a return electrode, wherein the first standoff results from the at least one sensor electrode being disposed in a first plane and the second standoff results from the at least one sensor electrode being disposed in a second plane offset from the first plane and the at least one sensor electrode and the return electrode are configured for injecting current into a formation and receiving a signal from the formation;
wherein the at least one sensor electrode comprises an output for providing measurement information for calculating electrical properties of the formation from the first and second impedance measurements.

* * * * *